(12) United States Patent
Yoshimura et al.

(10) Patent No.: US 9,656,864 B2
(45) Date of Patent: May 23, 2017

(54) METHOD FOR PRODUCING HYDROGEN FLUORIDE

(75) Inventors: Toshikazu Yoshimura, Osaka (JP); Masayoshi Imoto, Osaka (JP); Arata Sasatani, Osaka (JP); Akikazu Tabuchi, Osaka (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 1138 days.

(21) Appl. No.: 13/382,430

(22) PCT Filed: Jun. 24, 2010

(86) PCT No.: PCT/JP2010/060709
§ 371 (c)(1),
(2), (4) Date: Jan. 5, 2012

(87) PCT Pub. No.: WO2011/004715
PCT Pub. Date: Jan. 13, 2011

(65) Prior Publication Data
US 2012/0107223 A1    May 3, 2012

(30) Foreign Application Priority Data

Jul. 6, 2009  (JP) ................. 2009-159754

(51) Int. Cl.
*C01B 7/19*    (2006.01)
*C01F 11/46*   (2006.01)

(52) U.S. Cl.
CPC ............ *C01B 7/192* (2013.01); *C01F 11/46* (2013.01)

(58) Field of Classification Search
CPC ...................................... C01F 11/46
USPC ................................ 423/485, 555
See application file for complete search history.

(56) References Cited

U.S. PATENT DOCUMENTS

| | | | |
|---|---|---|---|
| 2,846,290 A | 8/1958 | Yacoe | |
| 2,932,557 A | 4/1960 | List et al. | |
| 3,024,123 A * | 3/1962 | Theilacker et al. ......... | 106/775 |
| 3,404,953 A | 10/1968 | Corbett | |
| 3,825,655 A | 7/1974 | Eipeltauer et al. | |
| 4,010,245 A * | 3/1977 | Spreckelmeyer et al. .... | 423/485 |
| 4,491,571 A * | 1/1985 | Suzuki et al. ............. | 423/485 |
| 6,355,221 B1 | 3/2002 | Rappas | |
| 2003/0124047 A1 | 7/2003 | Nishimura et al. | |

FOREIGN PATENT DOCUMENTS

| | | |
|---|---|---|
| CN | 1450976 A | 10/2003 |
| DE | 10 40 001 B | 3/1955 |
| DE | 1 037 431 | 11/1956 |
| EP | 1 300 362 A1 | 4/2003 |
| GB | 2159136 A | 11/1985 |
| JP | 4-40282 B2 | 7/1992 |
| JP | 2002-316805 A | 10/2002 |
| JP | 2004-352517 A | 12/2004 |
| JP | 2005-132652 A | 5/2005 |
| JP | 2007-112683 A | 5/2007 |

OTHER PUBLICATIONS

Extended European Search Report, dated May 28, 2013, for Patent Application No. 10797026.1.
Ren Linming et al., "A New Process of Hydrogen Fluoride of Production by Fluorite and Sulfuric Acid", New Chemcial Materials, vol. 28, No. 2, 2000, pp. 18-19.
International Preliminary Report on Patentability dated Feb. 14, 2012 and English translation of the Written Opinion of the International Searching Authority dated Sep. 7, 2010 for Application No. PCT/JP2010/060709 (Forms PCT/IB/373 and PCT/ISA/237).
English translation of Dittmeyer et al., "Chemische Technik, Band 3, Anorganische Grundstoffe, Zwischenprodukte", Republic Federal of Germany: WILEY-VCH Verlag GmbH & Co. KGaA, 2005.
English translation of Hass et al., "Neue Erkenntnisse zum Mechanismus der Fluorwasserstoffherstellung aus Flußspat und Schwefelsäure", Chem. Techn., 41. Jg., Heft 4, Apr. 1989, pp. 144-147.
English translation of Kemnitz et al., "Kinetische Untersuchungen zur Reaktion zwischen Calciumfluorid und Schwefelsäure", Z. phys. Chemie. Leipzig, vol. 271, No. 5, 1990, pp. 999-1007.
Communication of a notice of opposition, dated May 19, 2015, for European Application No. 10797026.1.
Dittmeyer et al., "Chemische Technik, Band 3, Anorganische Grundstoffe, Zwischenprodukte", Republic Federal of Germany: WILEY-VCH Verlag GmbH & Co. KGaA, 2005, 3 pages.
Hass et al., "Neue Erkenntnisse zum Mechanismus der Fluorwasserstoffherstellung aus Flußspat und Schwefelsäure", Chem. Techn., 41. Jg., Heft 4, Apr. 1989, pp. 144-147, including an English abstract.
Kemnitz et al., "Kinetische Untersuchungen zur Reaktion zwischen Calciumfluorid und Schwefelsäure", Z. phys. Chemie. Leipzig, vol. 271, No. 5, 1990, pp. 999-1007, including an English abstract.

* cited by examiner

*Primary Examiner* — Ngoc-Yen Nguyen
(74) *Attorney, Agent, or Firm* — Birch, Stewart, Kolasch & Birch, LLP

(57) ABSTRACT

The present invention provides a novel method for producing hydrogen fluoride, which is capable of using various calcium fluoride sources and preventing a second pasty state from occurring, effectively.
In a method for producing hydrogen fluoride by reacting calcium fluoride with sulfuric acid, following steps are conducted: (a) a step for mixing and reacting calcium fluoride particles having an average particle diameter of 1-40 μm with sulfuric acid at a sulfuric acid/calcium fluoride molar ratio of 0.9-1.1 under a temperature of 0-70° C. to obtain a solid-state reaction mixture; and (b) a step for heating the solid-state reaction mixture to a temperature of 100-200° C. to react with itself, and thereby producing hydrogen fluoride in a gas phase.

4 Claims, 1 Drawing Sheet

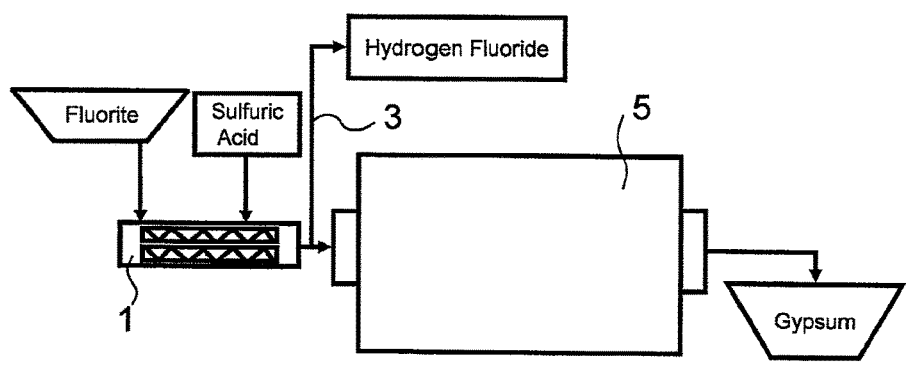
Prior Art

METHOD FOR PRODUCING HYDROGEN FLUORIDE

TECHNICAL FIELD

The present invention relates to a method for producing hydrogen fluoride, and more particularly to a method for producing hydrogen fluoride by reacting calcium fluoride particles with sulfuric acid.

BACKGROUND ART

Industrial methods for producing hydrogen fluoride (HF) generally use a reaction for generating hydrogen fluoride (HF) from fluorite ($CaF_2$) and sulfuric acid ($H_2SO_4$) (see, for example, Patent Literatures 1 to 3). Among such methods for producing hydrogen fluoride, there is known a type of method using a jacketed preliminary reactor and an externally heated rotary kiln in combination to conduct two-stage reaction steps. In this type of the producing method, it is known that three reactions occur through the respective reaction steps in the preliminary reactor and the rotary kiln (see, for example, Patent Literatures 4 and 5). Such a conventional method for producing hydrogen fluoride will be descried below by referring to FIG. 1.

Firstly, fluorite ($CaF_2$) and sulfuric acid ($H_2SO_4$), which has been mixed with oleum and preheated to 100° C., are separately supplied to a jacketed preliminary reactor 1 (e.g. biaxial kneader) at substantially equal molar amounts, and a solid-liquid mixture of them is kneaded while being heated at about 100° C. Under such a relatively low temperature condition, a reaction expressed by the following formula (1) occurs, dominantly.

$$CaF_2 + 2H_2SO_4 \rightarrow Ca(HSO_4)_2 + 2HF \quad (1)$$

A conversion ratio of $CaF_2$ at an outlet port of the preliminary reactor may be 40 to 60%. Hydrogen fluoride (HF) generated by the reaction of the formula (1) is mainly contained in a gas phase, and taken out through an induction pipe 3. A residual reaction mixture in a clayey-to-solid state comprising an intermediate product of $Ca(HSO_4)_2$ is transferred to an externally heated rotary kiln 5.

In the rotary kiln 5, the reaction mixture is heated to an increased temperature while it rolls and advances in a direction of a rotation axis. The rotary kiln 5 is heated by flowing hot air at about 500° C. through a jacket. A temperature of the reaction mixture is about 100° C. at an inlet port of the rotary kiln 5 communicating with the preliminary reactor 1, and increased towards an outlet port of the rotary kiln 5 locating at an opposed side thereof, and finally reaches to about 300° C. at the outlet port. Under such a high temperature condition, $Ca(HSO_4)_2$ in the reaction mixture degrades by a reaction expressed by the following formula (2). As a result, $H_2SO_4$ once spent by the reaction of the formula (1) appears again in the form of a liquid matter, and at the same time gypsum ($CaSO_4$) in a solid form is generated as a by-product.

$$Ca(HSO_4)_2 \rightarrow CaSO_4 + H_2SO_4 \quad (2)$$

Thus generated $H_2SO_4$ by the reaction of the formula (2) reacts with unreacted $CaF_2$ existing in the reaction mixture. Under the high temperature condition as in the rotary kiln 5, not the reaction of the above formula (1), but a reaction expressed by the following formula (3) occurs, dominantly.

$$CaF_2 + H_2SO_4 \rightarrow CaSO_4 + 2HF \quad (3)$$

Hydrogen fluoride (HF) generated by the reaction of the formula (3) is contained in a gas phase and taken out through the induction pipe 3. A residual reaction mixture mainly contains gypsum ($CaSO_4$) as the by-product, and it is taken out of the outlet port of the rotary kiln 5.

As described in the above, the intended hydrogen fluoride can be obtained by the two-stage reaction steps in the preliminary reactor and the rotary kiln.

CITATION LIST

Patent Literature

Patent Literature 1: U.S. Pat. No. 2,932,557 A
Patent Literature 2: U.S. Pat. No. 3,825,655 A
Patent Literature 3: JP 4-40282 B
Patent Literature 4: JP 2002-316805 A
Patent Literature 5: JP 2004-352517 A
Patent Literature 6: JP 2005-132652 A
Patent Literature 7: JP 2007-112683 A

SUMMARY OF INVENTION

Technical Problem

Conventionally, high quality (so-called acid grade) fluorite is used as a raw material for producing hydrogen fluoride. However, high quality fluorite is unevenly distributed, and most of it is from China. Thus, there is concern for exhaustion of its resource, and its price is getting high due to export regulation by the Chinese government. Under such circumstances, if other calcium fluoride sources such as fluorite from countries other than China and calcium fluoride recovered from chemical processes (see, for example, Patent Literatures 6 and 7) can be used in an industrial scale, it will be convenient. However, in the existing process for generating hydrogen fluoride which uses high quality fluorite from China (average particle diameter of 80-100 μm) as the raw material, when the raw material is merely changed to other calcium fluoride source, there arise problems due to difference in reactivity and so on. For example, a consistency of the mixture in the preliminary reactor is changed, so that a driving part or the like of the kneading member in the preliminary reactor is overloaded and/or the mixture adheres to the kneading member and the inner surface, resulting in troubles in operation of the preliminary reactor. Therefore, strict specification is practically set on the raw material such as quality and locality of fluorite and an acceptable upper limit (e.g. 5% or less) on a mixing ratio of recovered calcium fluoride when it is added to fluorite.

Also in the conventional method for producing hydrogen fluoride, while the raw materials of fluorite and sulfuric acid are separately supplied to the preliminary reactor, mixing and reaction of them are conducted at the same time. Thus, liquid sulfuric acid and solid fluorite which are supplied as the raw material, a slurry raw-material mixture of these raw materials, and a reaction mixture in a paste-to-solid state depending on progress of the reaction of the formula (1) exist in the preliminary reactor at a temperature of about 100° C., which may be considered as a relatively low temperature, but still high. Since sulfuric acid exists under such a temperature condition, it causes a problem of remarkable corrosion on the preliminary reactor.

The reaction mixture taken out of this preliminary reactor is generally in a solid state. When transferred to the rotary kiln, however, it turns into a pasty state again due to the progress of the reaction of the formula (2), and finally in the form of powder due to the progress of the reaction of the formula (3) in addition to the reaction of the formula (2).

This phenomenon of turning into a pasty state again (which is hereinafter referred to as a "second pasty" state) occurs by the fact that on transferring from the low temperature condition to the high temperature condition, the reaction of the formula (2) rapidly proceeds to generate a large amount of sulfuric acid.

Occurrence of the second pasty state is not preferable from various view points. In the second pasty state, the reaction mixture shows a very high corrosivity since it contains much sulfuric acid under the high temperature condition, and as a result it causes a problem of remarkable corrosion of the rotary kiln. Also, occurrence of the second pasty state causes a problem in that the pasty reaction mixture adheres to the inner surface of the rotary kiln. Therefore, it is necessary to use a high corrosion resistant material for the apparatus and set a short cycle for maintenance of the apparatus. Further, adhering of the reaction mixture (or scale forming) brings about a problem of a reduced efficiency of heat transfer of the rotary kiln. It becomes necessary to flow hot air at an even higher temperature through the jacket of the rotary kiln so as to compensate the reduced efficiency of heat transfer, which results in a large loss of energy.

In order to prevent or reduce occurrence of the second pasty state, some proposals have been made (see Patent Literatures 4 and 5). However, none of them fundamentally changes the conventional process for generating hydrogen fluoride. Such process has a narrow window for allowable operation conditions (operational state is unstable and requires high cost), and the second pasty state inevitably occurs somewhere in the reaction system.

An object of the present invention is to provide a novel method for generating hydrogen fluoride, which is capable of using various calcium fluoride sources, alleviating the problem of corrosion by sulfuric acid, and preventing the second pasty state from occurring, effectively.

Solution to Problem

The present inventors have reconsidered the process for generating hydrogen fluoride, fundamentally. A reaction for generating hydrogen fluoride from calcium fluoride and sulfuric acid is overall expressed by the following formula (A).

  (A)

Although the present invention is not bound to any theory, it is assumed that the following elementary reactions occur in effect.

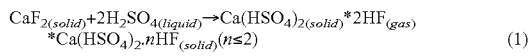  (1)

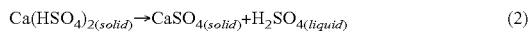  (2)

  (3)

The reaction of the above formula (1) may proceed at a relatively low temperature, and the smaller a particle diameter of calcium fluoride particles is, the larger a reaction rate of the formula (1) becomes. Sulfuric acid is used in a liquid state. As sulfuric acid is spent with the progress of the reaction, solid $Ca(HSO_4)_2$ (which may be either in a solid state alone or in a solid state together with hydrogen fluoride) is generated. On the other hand, the reaction of the above formulae (2) and (3) are competitive reactions which may proceed at a high temperature, and the smaller a particle diameter of calcium fluoride particles is, the larger a reaction rate of the formula (3) becomes. When the reaction rate of the formula (3) is larger than the reaction rate of the formula (2), the second pasty state is not generated in appearance since sulfuric acid generated by the reaction of the formula (2) is immediately spent by the reaction of the formula (3). On the basis of this findings, the present inventors have intensively studied on conditions which can avoid occurrence of the second pasty state regardless of a calcium fluoride source, more specifically on a particle diameter of calcium fluoride particles, a temperature condition of the reactions, a molar ratio of the raw materials, timing of mixing operation and so on, and as a result the present invention has been completed.

According to the first aspect of the present invention, there is provided a method for producing hydrogen fluoride by reacting calcium fluoride with sulfuric acid, which comprises (a) a step for mixing and reacting calcium fluoride particles having an average particle diameter of 1-40 μm with sulfuric acid at a sulfuric acid/calcium fluoride molar ratio of 0.9-1.1 under a temperature of 0-70° C. to obtain a solid-state reaction mixture; and (b) a step for heating the solid-state reaction mixture to a temperature of 100-200° C. to react with itself, and thereby producing hydrogen fluoride in a gas phase.

When any numerical range is mentioned in the present invention, the range includes the upper and lower limit values, which also applies hereinafter.

In the above step (a), using the calcium fluoride particles having the average particle diameter of 1-40 μm, the calcium fluoride particles and sulfuric acid are mixed and reacted with each other under the temperature of 0-70° C., and thereby the reaction of the formula (1) can proceed. Also in the step (a), with the sulfuric acid/calcium fluoride molar ratio of 0.9-1.1, calcium fluoride exists at the molar amount about two times larger than its stoichiometric amount in the formula (1). Therefore, as the reaction of the formula (1) proceeds, sulfuric acid in a liquid state is substantially disappeared in due course, so that the reaction mixture in a solid state can be obtained. Thus obtained solid-state reaction mixture contains the unreacted calcium fluoride particles having the average particle diameter of 1-40 μm at about one time (or equivalent) molar amount. Then in the step (b), since the solid-state reaction mixture obtained in the step (a) is heated to the temperature of 100-200° C. to react with itself (constituents of the solid-state reaction mixture each other), the reactions of the formulae (2) and (3) can proceed with the reaction rate of the formula (3) larger than the other. And, since the unreacted calcium fluoride particles having the average particle diameter of 1-40 μm exist at about one time molar amount in the solid-state reaction mixture in the step (b), sulfuric acid generated from the reaction of the formula (2) immediately reacts with the calcium fluoride particles according to the formula (3) at stoichiometric amounts, so that the mixture can remain in the solid state as a whole. Therefore, it becomes possible to produce hydrogen fluoride while effectively preventing the second pasty state from occurring. The produced hydrogen fluoride can be obtained in a gas phase.

According to the second aspect of the present invention, there is provided a method for producing hydrogen fluoride by reacting calcium fluoride with sulfuric acid, which comprises (c) a step for mixing and reacting calcium fluoride particles having an average particle diameter of 1-40 μm with sulfuric acid at a sulfuric acid/calcium fluoride molar ratio of 1.1-2.2 under a temperature of 0-70° C. to obtain a solid-state reaction mixture; and (d) a step for adding and mixing calcium fluoride particles having an average particle diameter of 1-40 μm to and with the solid-state reaction mixture at a (overall) sulfuric acid/calcium fluoride molar ratio of 0.9-1.1 in total of the steps (c) and (d), and then heating a resultant mixture to a temperature of 100-200° C. to react with itself, and thereby producing hydrogen fluoride in a gas phase.

In the above step (c), similarly to the step (a) described above, using the calcium fluoride particles having the average particle diameter of 1-40 μm, the calcium fluoride particles and sulfuric acid are mixed and reacted with each other under the temperature of 0-70° C., and thereby the reaction of the formula (1) can proceed. In the step (c), with the sulfuric acid/calcium fluoride molar ratio of 1.1-2.2, calcium fluoride exists at the excess amount compared with its stoichiometric amount in the formula (1). Therefore, as the reaction of the formula (1) proceeds, sulfuric acid in a liquid state is substantially disappeared in due course, so that the reaction mixture in a solid state can be obtained. Thus obtained solid-state reaction mixture contains the unreacted calcium fluoride particles having the average particle diameter of 1-40 μm at a molar amount not larger than about one time, depending on the sulfuric acid/calcium fluoride molar ratio. When the sulfuric acid/calcium fluoride molar ratio is high, the calcium fluoride particles may not exist, substantially. Then in the step (d), additional calcium fluoride particles having an average particle diameter of 1-40 μm are added to and mixed with the solid-state reaction mixture obtained in the step (c), and an amount of the additional calcium fluoride particles is selected so that a sulfuric acid/calcium fluoride molar ratio in total of the steps (c) and (d) is 0.9-1.1. Thus obtained mixture (which is hereinafter referred to as an "added mixture") contains the calcium fluoride particles having the average particle diameter of 1-40 μm at about one time (or equivalent) molar amount, as a result of summing the unreacted calcium fluoride particles from the step (c) and the added calcium fluoride particles in the step (d). Further in the step (d), this added mixture is heated to the temperature of 100-200° C. to react with itself (constituents of the added mixture each other), the reactions of the formulae (2) and (3) can proceed with the reaction rate of the formula (3) larger than the other. Since the calcium fluoride particles having the average particle diameter of 1-40 μm exists at about one time molar amount in the added mixture, sulfuric acid generated from the reaction of the formula (2) immediately reacts with the calcium fluoride particles according to the formula (3) at stoichiometric amounts, so that the mixture can remain in the solid state as a whole. Thus, by the added calcium fluoride particles which also have the average particle diameter of 1-40 μm, it becomes possible to produce hydrogen fluoride while effectively preventing the second pasty state from occurring. The produced hydrogen fluoride can be obtained in a gas phase.

In the above step (a) or (c), it is preferable to sufficiently mix the calcium fluoride particles with sulfuric acid before the reaction. The step (a) preferably comprises conducting raw-material mixing of the calcium fluoride particles having the average particle diameter of 1-40 μm and sulfuric acid at the sulfuric acid/calcium fluoride molar ratio of 0.9-1.1 under a temperature of 0-40° C., and then heating a resultant mixture to a temperature higher than the temperature of the raw-material mixing but not higher than 70° C. to react with itself, and thereby obtaining the solid-state reaction mixture. The step (c) preferably comprises conducting raw-material mixing of the calcium fluoride particles having the average particle diameter of 1-40 μm and sulfuric acid at the sulfuric acid/calcium fluoride molar ratio of 1.1-2.2 under a temperature of 0-40° C., and then heating a resultant mixture to a temperature higher than the temperature of the raw-material mixing but not higher than 70° C. to react with itself, and thereby obtaining the solid-state reaction mixture. Thus, it becomes possible to obtain the homogeneous solid-state reaction mixture in the step (a) or (c), and therefore to prevent the second pasty state from occurring in the step (b) or (d), more effectively.

In the method for producing hydrogen fluoride of the present invention, in either the first aspect or the second aspect described above, any calcium fluoride source can be used as long as it satisfies the average particle diameter of 1-40 μm. For example, fluorite, recovered or synthesized calcium fluoride, and a mixture of at least two kinds of them may be used for the calcium fluoride particles.

The "average particle diameter" in the present invention means a mean volume particle diameter of the particles determined by laser diffraction particle size distribution analysis. In a case where two or more kinds of the calcium fluoride particles are mixed together, when respective average particle diameters of them are in the range of 1-40 μm, it can be considered that an average particle diameter of the mixture as a whole is also in the range of 1-40 μm.

The "fluorite" in the present invention means ores or minerals containing calcium fluoride ($CaF_2$) as a main component, and may be any of those regardless of their locality.

According to the method for producing hydrogen fluoride of the present invention, the step (a) or (c) applies the very low temperature (0-70° C.) compared with the reaction step (about 100° C.) in the conventional preliminary reactor, and therefore it becomes possible to alleviate the problem of corrosion by sulfuric acid.

Further, according to method for producing hydrogen fluoride of the present invention, as described in the above, it becomes possible to prevent the second pasty state from occurring, effectively. Thus, various problems associated with occurrence of the second pasty state can be solved, substantially.

In addition, as understand from the temperature conditions in the steps (a) and (b) or the temperature conditions in the steps (c) and (d), a heat energy necessary to conduct the method for producing hydrogen fluoride of the present invention is less than a heat energy required for the conventional method for producing the hydrogen fluoride, and is energy saving.

The method for producing hydrogen fluoride of the present invention can be conducted in either continuous or batch manner.

Advantageous Effects of Invention

According to the present invention, there is provided the novel method for generating hydrogen fluoride, which is capable of using various calcium fluoride sources, and preventing the second pasty state from occurring, effectively.

BRIEF DESCRIPTION OF DRAWINGS

FIG. 1 is a schematic view for explaining the conventional method for generating hydrogen fluoride.

DESCRIPTION OF EMBODIMENTS

Embodiment 1

This embodiment relates to the method for producing hydrogen fluoride in the first aspect of the present invention.

First, calcium fluoride particles are prepared. The calcium fluoride particles shall have an average particle diameter of 1-40 µm. Due to the average particle diameter of the calcium fluoride particles being not smaller than 1 µm, the reaction mixture can be solidified with an appropriate velocity in the step (a) (or, a homogeneous solid-state reaction mixture can be obtained while preventing the solidification from proceeding excessively rapidly). Due to this diameter being not larger than 40 µm, it is able to effectively avoid occurrence of the second pasty state in the step (b). The average particle diameter of the calcium fluoride particles is preferably 5-30 µm. Due to this diameter being not smaller than 5 µm, it is able to prevent the reaction velocity from being too fast. Due to this diameter being not larger than 30 µm, it is able to surely avoid occurrence of the second pasty state.

For the calcium fluoride particles, any calcium fluoride source can be used as long as it has such average particle diameter. For example, it may be fluorite, recovered or synthesized calcium fluoride by chemical processes or the like, and may be those subjected to operation such as purification and/or grinding. In a case of using fluorite as the calcium fluoride particles, fluorite may be of any locality, for example, may be from China, Mexico, South Africa or others. The calcium fluoride particles have only to contain calcium fluoride as a main component, and may contain impurities such as silicon dioxide ($SiO_2$), calcium carbonate ($CaCO_3$), phosphorous (P), arsenic (As), calcium chloride ($CaCl_2$) and so on. The purity of the calcium fluoride particles is not specifically limited, but preferably 90% by weight or more, and more preferably 95% by weight or more.

For sulfuric acid, concentrated sulfuric acid, e.g. concentrated sulfuric acid of about 98% or more, can be used, generally. However, it is not limited thereto. For example, combinations of oleum ($SO_3$ and $H_2SO_4$) and water, of sulfur trioxide ($SO_3$) and water, of oleum and sulfur trioxide ($SO_3$) and water can be used to prepare sulfuric acid.

Step (a)

The calcium fluoride particles and sulfuric acid are mixed together (or stirred), positively (in other words, intentionally, for example, by adding external force, which also applies hereinafter), of which amounts satisfy a sulfuric acid/calcium fluoride molar ratio of 0.9-1.1. Depending on kinds of impurities in the calcium fluoride particles, for the purpose of compensate consumption of sulfuric acid by the impurities, sulfuric acid and/or $SO_3$ may be charged with an excess amount corresponding to the consumption. While the mixing has only to be conducted at a temperature of 0-70° C., the temperature is preferably increased after raw-material mixing.

The raw-material mixing can be conducted at a temperature of 0-40° C. Due to the temperature being not less than 0° C., sulfuric acid can be retained at a liquid state without freezing. Due to the temperature being not larger than 40° C., this can slow the reaction rate of the formula (1), sufficiently. Thus, a mixture can be obtained in the form of a substantially homogeneous slurry, while the reaction of the formula (1) is prevented. The temperature of the raw-material mixing is more preferably 0-30° C. Due to the temperature being not larger than 30° C., it is able to prevent the raw-material mixture from solidifying during the mixing. It is desirable to conduct the raw-material mixing, promptly. When the time period thereof is not larger than 20 minutes, the raw-material mixture can be prepared uniformly, before it solidifies.

After the raw-material mixing, the resultant slurry mixture (raw-material mixture) is heated to a temperature which is higher than the temperature for the raw-material mixing but not larger than 70° C. By increasing the temperature of the raw-material mixture, the reaction rate of the formula (1) can be increased. Due to the temperature being not larger than 70° C., a reaction mixture can be homogeneously solidified at an appropriate rate while the risk of corrosion by sulfuric acid is alleviated, and this is also convenient for easier control in operation. Thus, the reaction of formula (1) proceeds to spent sulfuric acid in a liquid state and generate $Ca(HSO_4)_2$ in a solid state. During this time, the raw-material mixture changes its form from slurry to solid, and therefore scraping (or stirring or mixing) of the mixture is desirably conducted to prevent it from adhering to the reactor. The heating temperature may vary depending on the temperature for the raw-material mixing, it is more preferably 20-50° C. Due to the heating temperature being not less than 20° C., it is able to attain a practically preferable time period for solidification. Due to the heating temperature being not larger than 50° C., the corrosion can be further suppressed. The heating time may be, for example, 1-40 minutes. Due to it being not shorter than 1 minute, the sufficient time period for solidification can be obtained. Due to it being not longer than 40 minutes, this can prevent the apparatus from becoming too large in scale. Hydrogen fluoride concurrently generated may exist in the gas phase or in the solid mixture. Hydrogen fluoride existing in the gas phase is preferably recovered to be purified and separated as the aimed product.

Thus, a solid-state reaction mixture which is preferably homogeneous can be obtained. The resultant solid-state reaction mixture contains generated $Ca(HSO_4)_2$ and unreacted $CaF_2$ at almost equimolar amounts. The conversion ratio of $CaF_2$ at this time may be 50%±5%, although it may vary depending on specific reaction conditions.

Step (b)

The solid-state reaction mixture obtained in the above described step (a) is heated to a temperature of 100-200° C. Due to the temperature being not less than 100° C., hydrogen fluoride can be obtained in a gas phase with a sufficient evaporation rate. Due to the temperature being not larger than 200° C., pyrolysis or evaporation of sulfuric acid can be prevented. The calcium fluoride particles contained in the solid-state reaction mixture have the average particle diameter of 1-40 µm and made homogeneous by the mixing, so that even at such lower temperature than that in conventional method the reactions of the formulae (2) and (3) proceed and the reaction rate of the formula (3) is larger than that of the formula (2). Therefore, sulfuric acid in a liquid state which is generated by the formula (2) is immediately spent by reacting with the unreacted calcium fluoride existing in the reaction mixture, and the reaction mixture can remain in the solid state as a whole. During this time, it is not preferable to positively mix (or stir) the reaction mixture since unwanted powder dust is dispersed in the gas phase and involved with hydrogen fluoride. However, the mixing (or stirring) may be conducted when gypsum generated as a by-product is wanted to be obtained in the form of fluidity (powder). It is preferable that the larger the average particle diameter of the calcium fluoride particles is within the range of 1-40 µm, the lower the heating temperature is within the range of 100-200° C. The heating temperature is more preferably 100-160° C. Due to the temperature being not larger than 160° C., the corrosion can be prevented. The heating time may be, for example, 10-60 minutes. Due to it being not shorter than 10 minute, hydrofluoric acid can evaporate, sufficiently. Due to it being not longer than 60 minutes, this can prevent the apparatus from becoming too large in scale. Hydrogen fluoride thus generated can be obtained in the gas phase, and is preferably recovered to be purified and separated as the aimed product.

Thus, it is able to obtain hydrogen fluoride in the gas phase while effectively preventing the second pasty state from occurring. The residue of the reaction mixture is in a solid state and may mainly contain gypsum as the by-product. The conversion ratio of $CaF_2$ at this time may reach 90% or more and preferably 95% or more, although it may vary depending on specific reaction conditions.

Embodiment 2

This embodiment relates to the method for producing hydrogen fluoride in the second aspect of the present invention. This will be hereinafter described focusing on different points from Embodiment 1, and similar explanations to Embodiment 1 will apply to this embodiment unless otherwise specified.

Also in this embodiment, calcium fluoride particles having an average particle diameter of 1-40 μm are used, and any calcium fluoride source can be used as long as it has such average particle diameter.

Step (c)

The calcium fluoride particles and sulfuric acid are mixed together (or stirred), positively, of which amounts satisfy a sulfuric acid/calcium fluoride molar ratio of 1.1-2.2. While the mixing has only to be conducted at a temperature of 0-70° C., the temperature is preferably increased after raw-material mixing wherein the calcium fluoride particles and sulfuric acid are mixed together at the sulfuric acid/calcium fluoride molar ratio of 1.1-2.2. The sulfuric acid/calcium fluoride molar ratio is preferably 1.1-2.0. Due to this molar ratio being not larger than 2.0, it is able to substantially eliminate unreacted sulfuric acid. As for the rest, they are similar to the step (a) in Embodiment 1.

Thus, a solid-state reaction mixture which is preferably homogeneous can be obtained. The resultant solid-state reaction mixture may contain generated $Ca(HSO_4)_2$ and unreacted $CaF_2$, and the ratio of the unreacted $CaF_2$ may vary depending on the sulfuric acid/calcium fluoride molar ratio of the raw materials. When the sulfuric acid/calcium fluoride molar ratio of the raw materials is high (for example, 2.0-2.2), substantially non-existence of the calcium fluoride particles is possible. The conversion ratio of $CaF_2$ at this time is within the range of about 50% to 100%, depending especially on the sulfuric acid/calcium fluoride molar ratio of the raw materials.

Step (d)

The solid-state reaction mixture obtained in the above described step (c) is added with calcium fluoride particles having an average particle diameter of 1-40 μm. The amount of the additional calcium fluoride particles is selected so that the sulfuric acid/calcium fluoride molar ratio in total of the steps (c) and (d) results in 0.9-1.1. The additional calcium fluoride particles may be from a calcium fluoride source which is either the same as or different from that used in the step (c). After the calcium fluoride particles are added to the above described solid-state reaction mixture, they are mixed (or stirred) together, positively to obtain a mixture which is preferably homogeneous (added mixture, which is also in a solid state). Then, thus resultant added mixture is heated to a temperature of 100-200° C. As for the rest, they are similar to the step (a) in Embodiment 1.

Thus, also in this embodiment, it is able to obtain hydrogen fluoride in the gas phase while effectively preventing the second pasty state from occurring. The residue of the reaction mixture is in a solid state and may mainly contain gypsum as the by-product. The conversion ratio of $CaF_2$ at this time may reach 90% or more and preferably 95% or more, although it may vary depending on specific reaction conditions.

EXAMPLES

Examples 1-3

These Examples 1-3 relate to the method for producing hydrogen fluoride in the first aspect of the present invention.

Step (a)

As calcium fluoride ($CaF_2$) particles, fluorites from China having various average particle diameters shown in Table 1 were used. The calcium fluoride particles and sulfuric acid were separately located in a thermostatic chamber set at 40° C. to prepare them settled at the temperature in the thermostatic chamber. A weight of the calcium fluoride particles and a weight of sulfuric acid which were used (and therefore a sulfuric acid/calcium fluoride molar ratio) were almost same for Examples 1-3.

In this thermostatic chamber, the prepared fluorite was charged into a vessel made of PFA (tetrafluoroethylene-perfluoroalkylvinyl ether copolymer) and sulfuric acid was poured thereon gently.

After sulfuric acid was poured, the fluorite and sulfuric acid were stirred with the use of a stirring rod to obtain a raw-material mixture in the form of a homogeneous slurry. The mixing temperature was considered as the temperature set for the thermostatic chamber.

The slurry raw-material mixture was subsequently left at rest. Whether (with the progress of the reaction during this time) the reaction mixture became solidified (a solid-state reaction mixture was obtained) or not was visually observed, and a time period from a time point of pouring sulfuric acid to a time point of the reaction mixture becoming solidified was determined as an initial solidification time period "t".

Step (b)

Promptly after solidification, the reaction mixture obtained in the step (a) was transferred to a vessel lined with a fluororesin and controlled at a predetermined temperature, and stirred with the use of a stirring rod.

While the stirring was continued, whether (with the progress of the reaction during this time) the reaction mixture became pasty again (the second pasty state occurred) along the way or not was visually observed.

During this time, hydrogen fluoride was produced in a gas phase.

As to Example 1, a time period from a time point of transferring the reaction mixture obtained in the step (a) to the vessel to a time point of finishing the production of hydrogen fluoride from the reaction mixture was determined as a high temperature reaction time period, and it was 50 minutes.

Operation conditions and results for the respective examples are shown in Table 1. In the table, weights of $CaF_2$ particles and sulfuric acid are net weights of $CaF_2$ and sulfuric acid, and "$H_2SO_4/CaF_2$ (mol/mol)" means a sulfuric acid/calcium fluoride molar ratio used in the step (a). As to the results of observation whether it became "Solidified" or not, a case of becoming solidified is shown as "Solidified" and a case of not becoming solidified is shown as "No". As to the results of observation whether the "Second pasty" state occurred or not, a case of occurrence is shown as "Yes" and a case of no occurrence is shown as "No". (These also apply to other tables.)

In Examples 1-3, a solid-state reaction mixture was obtained in the step (a), and occurrence of the second pasty state was not observed in the step (b).

Comparative Examples 1 and 2

These Comparative Examples 1 and 2 are comparative examples to the method for producing hydrogen fluoride in the first aspect of the present invention, and used calcium fluoride particles having average particle diameters equal to and larger than the upper limit for the range of the average particle diameter in the present invention.

Similar procedures to Example 1 were carried out, except that an average particle diameter of calcium fluoride particles used as the raw material and a heating temperature (reaction temperature) in the step (b) were changed. A weight of the calcium fluoride particles and a weight of sulfuric acid which were used (and therefore a sulfuric acid/calcium fluoride molar ratio) were almost same as Example 1.

Operation conditions and results for these Comparative Examples 1 and 2 are shown in Table 1.

In Comparative Example 1, where the calcium fluoride particles having the average particle diameter of 40 μm was used in the step (a), a solid-state reaction mixture was obtained in the step (a), but occurrence of the second pasty state was observed in the step (b). This is because the heating temperature in the step (b) was too high.

In Comparative Example 2, even after 40 minutes had passed from the time point of pouring sulfuric acid in the step (a), the reaction mixture did not became solidified. In the step (b), the reaction mixture obtained in the step (a) in the form of a slurry was transferred as it is to a vessel lined with a fluororesin and controlled at 110° C., and stirred with the use of a stirring rod, resulting in the reaction mixture solidified. In the step (b), a time period from a time point of transferring the reaction mixture in the form of a slurry to the vessel to a time point of the reaction mixture becoming solidified was determined as a post-heating solidification time period, and it was 0.8 minute. After the reaction mixture became solidified, whether it became pasty again (the second pasty state occurred) along the way or not was visually observed. As a result, the second pasty state was observed.

Comparative Example 3

This Comparative Example is a comparative example to the method for producing hydrogen fluoride in the first aspect of the present invention, and did not conduct mixing in the step (a).

Similar procedures to Example 1 were carried out, except that after sulfuric acid was poured, a resultant was not subjected to sufficient stirring, but subsequently left at rest. A weight of the calcium fluoride particles and a weight of sulfuric acid which were used (and therefore a sulfuric acid/calcium fluoride molar ratio) were almost same as Example 1.

Operation conditions and results for this Comparative Example are shown in Table 1. In this Comparative Example, a solid-state reaction mixture was obtained in the step (a), but occurrence of the second pasty state was observed in the step (b).

TABLE 1

| | Step (a) | | | | | | Step (b) | |
|---|---|---|---|---|---|---|---|---|
| | $CaF_2$ particles | | | | | Initial | | |
| | Average particle diameter (μm) | Sulfuric acid Weight (g) | Weight (g) | $H_2SO_4/CaF_2$ (mol/mol) | Temperature (° C.) | Solidified | solidification time period (minutes) | Temperature (° C.) | Second pasty |
| Example 1 | 8 | 3.80 | 5.11 | 1.07 | 40.0 | Solidified | 12 | 140 | No |
| Example 2 | 34 | 3.80 | 4.85 | 1.02 | 40.0 | Solidified | 38 | 200 | No |
| Example 3 | 40 | 3.90 | 5.10 | 1.04 | 40.0 | Solidified | 40 | 110 | No |
| Comparative Example 1 | 40 | 3.90 | 5.23 | 1.07 | 40.0 | Solidified | 40 | 210 | Yes |
| Comparative Example 2 | 56 | 3.80 | 5.23 | 1.10 | 40.0 | No | — | 110 | Yes |
| Comparative Example 3 (no mixing) | 8 | 3.80 | 5.01 | 1.05 | 40.0 | Solidified | 16 | 140 | Yes |

Example 4

This example is a modified example from Example 1, and used a mixture of two kinds of particles for a material of calcium fluoride particles as the raw material.

In the step (a), a mixture of 1.90 g of fluorite from China having an average particle diameter of 34 μm and 1.90 g of recovered calcium fluoride particles having an average particle diameter of 17 μm was used as calcium fluoride ($CaF_2$) particles. This recovered calcium fluoride was obtained by letting water absorb hydrogen fluoride (HF) which was generated by thermal decomposition of fluorine containing compounds, neutralizing it with slaked lime ($Ca(OH)_2$) to produce calcium fluoride ($CaF_2$), adding a coagulating agent to a resultant slurry solution to concentrate and precipitate calcium fluoride, separating it from water and then drying it. Except for these, similar procedures to Example 1 were carried out. A total weight of the calcium fluoride particles and a weight of sulfuric acid which were used (and therefore a sulfuric acid/calcium fluoride molar ratio) were almost same as Example 1.

Operation conditions and results for this Example are shown in Table 2. Also in this Example, a solid-state reaction mixture was obtained in the step (a), and occurrence of the second pasty state was not observed in the step (b).

TABLE 2

| | CaF₂ particles | | Step (a) | | | | Initial solidification time period (minutes) | Step (b) | |
|---|---|---|---|---|---|---|---|---|---|
| | Average particle diameter (μm) | Weight (g) | Sulfuric acid Weight (g) | $H_2SO_4/CaF_2$ (mol/mol) | Temperature (° C.) | Solidified | | Temperature (° C.) | Second pasty |
| Example 4 | 34 + 17 | 1.90 + 1.90 | 4.79 | 1.00 | 40.0 | Solidified | 3 | 140 | No |

Example 5

This example relates to the method for producing hydrogen fluoride in the second aspect of the present invention.

For the step (c), 1.95 g of calcium fluoride reagent having an average particle diameter of 13 μm (manufactured by Wako Pure Chemical Industries, Ltd.) was used as calcium fluoride ($CaF_2$) particles together with 5.40 g of sulfuric acid, and a temperature was set at 0° C. A reaction mixture solidified in the step (c) was added with 1.95 g of fluorite from China having an average particle diameter of 40 μm as calcium fluoride ($CaF_2$) particles, and stirred with the use of a stirring rod, sufficiently. In the step (d), the reaction mixture thus obtained was transferred to a vessel lined with a fluororesin and controlled at 120° C., and stirred with the use of a stirring rod. Except for these, similar procedures to the step (a) and the step (b) in Example 1 were carried out to conduct the step (c) and the step (d), respectively.

Operation conditions and results for this Example are shown in Table 3. In the table, "Total $H_2SO_4/CaF_2$ (mol/mol)" means a sulfuric acid/calcium fluoride molar ratio in total used in the step (c) and the step (d). Also in this Example, a solid-state reaction mixture was obtained in the step (c), and occurrence of the second pasty state was not observed in the step (d).

Comparative Example 4

This Comparative Example is a comparative example to the method for producing hydrogen fluoride in the second aspect of the present invention, and conducted addition of calcium fluoride particles having a larger average particle diameter in the step (d).

Similar procedures to Example 5 were carried out, except that an average particle diameter of calcium fluoride ($CaF_2$) particles added in the step (d) was changed and a heating temperature was set at 160° C. A weight of the calcium fluoride particles and a weight of sulfuric acid which were used in the step (c) (and therefore a sulfuric acid/calcium fluoride molar ratio) were almost same as Example 1.

Operation conditions and results for this Comparative Example are shown in Table 3. In this Comparative Example, a solid-state reaction mixture was obtained in the step (c), but occurrence of the second pasty state was observed in the step (d).

TABLE 3

| | Step (c) | | | | | | | Step (d) | | | | |
|---|---|---|---|---|---|---|---|---|---|---|---|---|
| | CaF₂ particles | | Sulfuric | | | | Initial solidification | CaF₂ particles | | Total | | |
| | Average particle diameter (μm) | Weight (g) | acid Weight (g) | $H_2SO_4/CaF_2$ (mol/mol) | Temperature (° C.) | Solidified | time period (minutes) | Average particle diameter (μm) | Weight (g) | $H_2SO_4/CaF_2$ (mol/mol) | Temperature (° C.) | Second pasty |
| Example 5 | 13 | 1.95 | 5.40 | 2.20 | 0.0 | Solidified | 1.5 | 40 | 1.95 | 1.10 | 120 | No |
| Comparative Example 4 | 13 | 1.91 | 4.90 | 2.04 | 0.0 | Solidified | 1.6 | 85 | 1.90 | 1.02 | 160 | Yes |

INDUSTRIAL APPLICABILITY

The method for producing hydrogen fluoride of the present invention can be used to replace the conventional method for producing hydrogen fluoride, and is able to largely alleviate practical restrictions on the calcium fluoride source and the operation conditions and to effectively prevent the second pasty state from occurring.

REFERENCE SIGNS LIST

1 Preliminary reactor
3 Induction pipe
5 Rotary kiln

The invention claimed is:

1. A method for producing hydrogen fluoride by reacting calcium fluoride with sulfuric acid, which comprises:
    (a)(1) conducting raw-material mixing and reacting of calcium fluoride particles having an average particle diameter of 1-40 μm and sulfuric acid at a sulfuric acid/calcium fluoride molar ratio of 0.9-1.1 under a temperature of 0-40° C. to form a first mixture,
    (a)(2) then heating the first mixture to a temperature higher than the temperature of the raw-material mixing but not higher than 70° C. so that the calcium fluoride particles and sulfuric acid react and form a solid-state reaction mixture; and
    (b) heating the solid-state reaction mixture to a temperature of 100-200° C. to react with itself, and thereby produce hydrogen fluoride in a gas phase, wherein the reaction mixture remains in the solid state during said heating of the solid-state reaction mixture.

2. A method for producing hydrogen fluoride by reacting calcium fluoride with sulfuric acid, which comprises:

(a)(1) conducting raw-material mixing and reacting of calcium fluoride particles having an average particle diameter of 1-40 μm and sulfuric acid at a sulfuric acid/calcium fluoride molar ratio of 1.1-2.2 under a temperature of 0-40° C. to form a first mixture, (a)(2) then heating the first mixture to a temperature higher than the temperature of the raw-material mixing but not higher than 70° C. so that the calcium fluoride particles and sulfuric acid react to form a solid-state reaction mixture; and (b)(1) adding and mixing calcium fluoride particles having an average particle diameter of 1-40 μm to and with the solid-state reaction mixture at a sulfuric acid/calcium fluoride molar ratio of 0.9-1.1 in total for steps (a)(1), (a)(2) and (b)(1) to form a second mixture, and (b)(2) then heating the second mixture to a temperature of 100-200° C. to react with itself, and thereby producing hydrogen fluoride in a gas phase, wherein the reaction mixture remains in the solid state during said heating of the second mixture.

3. The method according to claim 1, wherein the calcium fluoride particles comprise fluorite, recovered or synthesized calcium fluoride, or a mixture of the fluorite and calcium fluoride.

4. The method according to claim 2, wherein the calcium fluoride particles comprise fluorite, recovered or synthesized calcium fluoride, or a mixture of the fluorite and calcium fluoride.

* * * * *